United States Patent
Lee et al.

(10) Patent No.: US 10,963,930 B2
(45) Date of Patent: Mar. 30, 2021

(54) APPARATUS FOR AUTOMATICALLY BILLING A VEHICLE LEFT UNATTENDED IN A CHARGING STATION, A SYSTEM HAVING SAME, AND A METHOD THEREOF

(71) Applicants: HYUNDAI MOTOR COMPANY, Seoul (KR); KIA MOTORS CORPORATION, Seoul (KR)

(72) Inventors: Tae Woo Lee, Suwon-si (KR); Seung Myun Chung, Seoul (KR); Jin Cheol Shin, Hwaseong-si (KR); Ha Young Woo, Anyang-si (KR); Kyu Beom Ko, Incheon (KR); Ik Jun Choi, Seoul (KR); Deok Keun Shin, Seongnam-si (KR); Jae Seok You, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 204 days.

(21) Appl. No.: 16/201,626

(22) Filed: Nov. 27, 2018

(65) Prior Publication Data

US 2020/0118181 A1     Apr. 16, 2020

(30) Foreign Application Priority Data

Oct. 15, 2018   (KR) .......................... 10-2018-0122832

(51) Int. Cl.
| | | |
|---|---|---|
| *G06Q 30/02* | (2012.01) | |
| *G07F 15/00* | (2006.01) | |
| *B60L 53/60* | (2019.01) | |
| *B60L 53/66* | (2019.01) | |
| *B60L 53/63* | (2019.01) | |
| *B60L 53/64* | (2019.01) | |

(52) U.S. Cl.
CPC .......... *G06Q 30/0284* (2013.01); *B60L 53/60* (2019.02); *B60L 53/63* (2019.02); *B60L 53/665* (2019.02); *G07F 15/003* (2013.01); *G07F 15/005* (2013.01); *B60L 53/64* (2019.02)

(58) Field of Classification Search
None
See application file for complete search history.

(56) References Cited

U.S. PATENT DOCUMENTS

| | | | |
|---|---|---|---|
| 9,428,064 B2 | 8/2016 | Ono | |
| 2013/0106172 A1* | 5/2013 | Ono .................... | B60L 11/18 307/9.1 |
| 2013/0346166 A1* | 12/2013 | Chihara ............... | B60L 53/665 705/13 |

(Continued)

FOREIGN PATENT DOCUMENTS

| | | |
|---|---|---|
| JP | 5780269 | 9/2015 |
| KR | 20170112403 | 10/2017 |

*Primary Examiner* — Lail A Kleinman
(74) *Attorney, Agent, or Firm* — Lempia Summerfield Katz LLC (57) ABSTRACT

An apparatus, a system, and a method are for automatically billing a vehicle left unattended in a charging station. The automatic billing apparatus includes a processor that provides a vehicle charging service at a charging station, determines that a vehicle is unattended after charging is completed, and performs a billing based on an unattended time. The apparatus further includes a storage that stores data obtained by the processor when the billing is performed.

18 Claims, 6 Drawing Sheets

(56) References Cited

U.S. PATENT DOCUMENTS

| | | |
|---|---|---|
| 2015/0015188 A1 | 1/2015 | Ono |
| 2016/0185246 A1* | 6/2016 | Paul ................. B60L 53/67 320/106 |
| 2018/0099570 A1* | 4/2018 | Katanoda ............ B60L 53/63 |
| 2019/0160958 A1* | 5/2019 | Chaudhary .......... B60L 53/665 |
| 2020/0079236 A1* | 3/2020 | Morizono ............ B60L 53/67 |

* cited by examiner

APPARATUS FOR AUTOMATICALLY BILLING A VEHICLE LEFT UNATTENDED IN A CHARGING STATION, A SYSTEM HAVING SAME, AND A METHOD THEREOF

CROSS-REFERENCE TO RELATED APPLICATION

This application claims the benefit of priority to Korean Patent Application No. 10-2018-0122832, filed in the Korean Intellectual Property Office on Oct. 15, 2018, the entire contents of which are incorporated herein by reference.

BACKGROUND

Technical Field

The present disclosure relates to an apparatus for automatically billing a vehicle left unattended in a charging station, a system having the same, and a method thereof. More specifically, the present disclosure relates to a technology of distinguishing a vehicle left in a charging station after charging and billing the vehicle for an amount of time left.

Description of Related Art

Most charging stations are provided with common chargers, which are operated to be used by many people. Since only one vehicle can be charged per charger at a time, a charger cannot be used by another vehicle until the charging of the charging vehicle is completed. In order to use the charger, the charged vehicle must be moved before a following vehicle can be charged. In this case, after removing a charging station connector, a user of the following vehicle connects the charging station connector to the following vehicle for charging. However, some vehicles have an inlet lock device on a vehicle inlet that prevents the charging station connector from being pulled out after the charging is finished. Accordingly, other vehicles may not be able to use the charger.

As electric vehicles are becoming more widespread, the number of users who use public charging stations are increasing. The corresponding wait time is gradually increasing as the rate of using charging stations is increased. Efficiency is accordingly lowered when the charged vehicle is not moved without detaching the connector even after the charging is completed because the following vehicle may not be charged at the charging station.

SUMMARY

The present disclosure has been made to solve the above-mentioned problems occurring in the prior art, while advantages achieved by the prior art are maintained intact.

An aspect of the present disclosure is to provide an apparatus for automatically billing a vehicle left unattended in a charging station, a system having the same, and a method thereof. The apparatus, the system, and the method are capable of automatically collecting a fee by determining a time for which the vehicle is left unattended after the charging is completed and determines whether the vehicle should be charged a fine when the vehicle is left attended after being charged, thereby inducing a charged vehicle to move out of the charging station.

The technical problems to be solved by the present disclosure are not limited to the aforementioned problems. Any other technical problems not mentioned herein will be clearly understood from the following description by those having ordinary skill in the art to which the present disclosure pertains.

According to an aspect of the present disclosure, an automatic billing apparatus includes a processor. The processor is configured to provide a vehicle charging service at a charging station, determine a vehicle unattended after charging is completed, and perform billing based on an unattended time. The apparatus further includes a storage that stores data obtained by the processor when the billing is performed.

The automatic charging apparatus may further include a voltage sensor that senses a voltage level of a voltage signal applied to a charging station connector.

The processor may determine whether a vehicle inlet and the charging station connector are coupled based on a change in the voltage level of the voltage signal sensed by the voltage sensor.

The processor may determine that the vehicle inlet and the charging station connector are not coupled when the voltage level of the voltage signal sensed by the voltage sensor is a first level, determine that the vehicle inlet and the charging station connector are coupled when the voltage level of the voltage signal is a second level lower than the first level, determine that the vehicle inlet and the charging station connector are in a charging state when the voltage level of the voltage signal is a third level lower than the second level, determine that the charging is completed but the vehicle inlet and the charging station connector are coupled when the voltage level of the voltage signal is increased to the second level, and determine that the charging is completed and the vehicle inlet is detached from the charging station connector when the voltage level of the voltage signal is increased to the third level.

The processor may calculate unattended time by counting a connection maintaining time of the vehicle inlet and the charging station connector from a time when the vehicle inlet and the charging station connector are continuously coupled after the charging of the vehicle is completed.

The processor may bill a parking fee based on the unattended time.

The processor may determine whether the vehicle that has completed charging is an object to be charged a fine, based on the unattended time.

The processor may determine that the vehicle that has completed the charging is the object to be charged a fine when the unattended time exceeds a specified time.

The processor may calculate a weight based on whether the unattended time is in an electric overload time zone and/or a number of waiting vehicles to charge and calculate a billed amount based on the unattended time and the weight.

The processor may charge the billed amount by adding the billed amount to a charging fee.

The processor may transmit a charge end notification text to a user terminal when the charging is completed.

According to another aspect of the present disclosure, a charging system includes a vehicle charging control device that controls charging of a vehicle and an automatic billing apparatus that interworks with the vehicle charging control device to provide a vehicle charging service at a charging station, determines a vehicle is unattended after charging is completed, and performs billing based on an unattended time.

According to still another aspect of the present disclosure, an automatic billing method includes providing charging to a vehicle that requests a vehicle charging service, determining a vehicle is unattended after the charging is completed, calculating an unattended time of the unattended vehicle, and performing billing based on the unattended time.

The determining of the unattended vehicle may include sensing a voltage level of a voltage signal applied to a charging station connector, determining whether a vehicle inlet and the charging station connector are coupled based on a change in the voltage level of the sensed voltage signal, and determining a vehicle as the unattended vehicle when the vehicle inlet and the charging station connector are continuously coupled after the charging of the vehicle is completed.

The determining of the connection between the vehicle inlet and the charging station connector may include determining that the vehicle inlet and the charging station connector are not coupled when the voltage level of the voltage signal is a first level, determining that the vehicle inlet and the charging station connector are coupled when the voltage level of the voltage signal is a second level lower than the first level, determining that the vehicle inlet and the charging station connector are in a charging state when the voltage level of the voltage signal is a third level lower than the second level, determining that the charging is completed but the vehicle inlet and the charging station connector are coupled when the voltage level of the voltage signal is increased to the second level, and determining that the charging is completed and the vehicle inlet is detached from the charging station connector when the voltage level of the voltage signal is increased to the third level.

The calculating of the unattended time of the vehicle may include calculating the unattended time by counting a connection maintaining time of the vehicle inlet and the charging station connector from a time when the vehicle inlet and the charging station connector are continuously coupled after the charging of the vehicle is completed.

The performing of the billing may include billing a parking fee based on the unattended time.

The performing of the billing may include determining that the vehicle that has completed the charging is the object to be charged a fine when the unattended time exceeds a specified time.

The performing of the billing may include calculating a weight based on whether the unattended time is in an electric overload time zone and/or a number of waiting vehicles to charge and calculating a fine based on the unattended time and the weight.

The performing of the billing may include billing the fine by adding the fine to a charging fee.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Hereinafter, embodiments of the present disclosure are described in detail with reference to the accompanying drawings. In the drawings, the same reference numbers are used throughout to designate the same or equivalent elements. In addition, a detailed description of well-known features or functions is not included in order to avoid unnecessarily obscuring the gist of the present disclosure.

In describing the components of the present disclosure, terms like first, second, A, B, (a), (b), and the like may be used. These terms are intended solely to distinguish one component from another. The terms do not limit the nature, sequence, or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application.

The present disclosure discloses a configuration that is capable of determining whether an electric vehicle is unattended after being charged at an electric charging station and automatically billing a parking fee in consideration of the time that the vehicle has been left unattended. In addition, the present disclosure discloses a configuration that is capable of determining whether an electronic vehicle is an object to be charged a fine when the electric vehicle is left unattended after being charged, calculating a weight based on an electric overload time zone and/or the number of charged vehicles, and calculating and billing a fine.

Hereinafter, embodiments of the present disclosure will be described in detail with reference to FIGS. 1 to 6.

Figure 1:
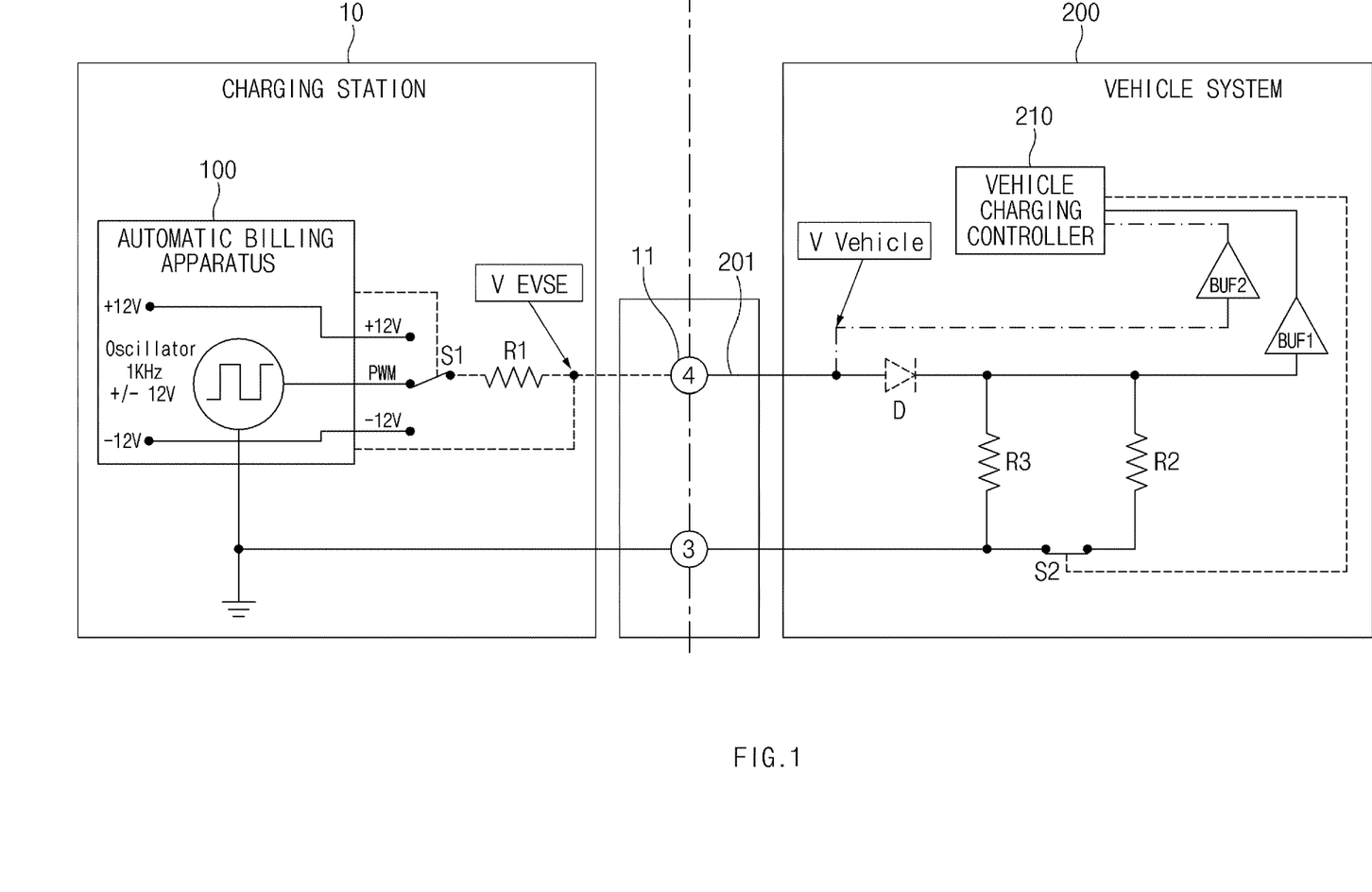
FIG. 1 is a block diagram illustrating a configuration of a system including an automatic billing apparatus according to an embodiment of the present disclosure.
Figure 2:
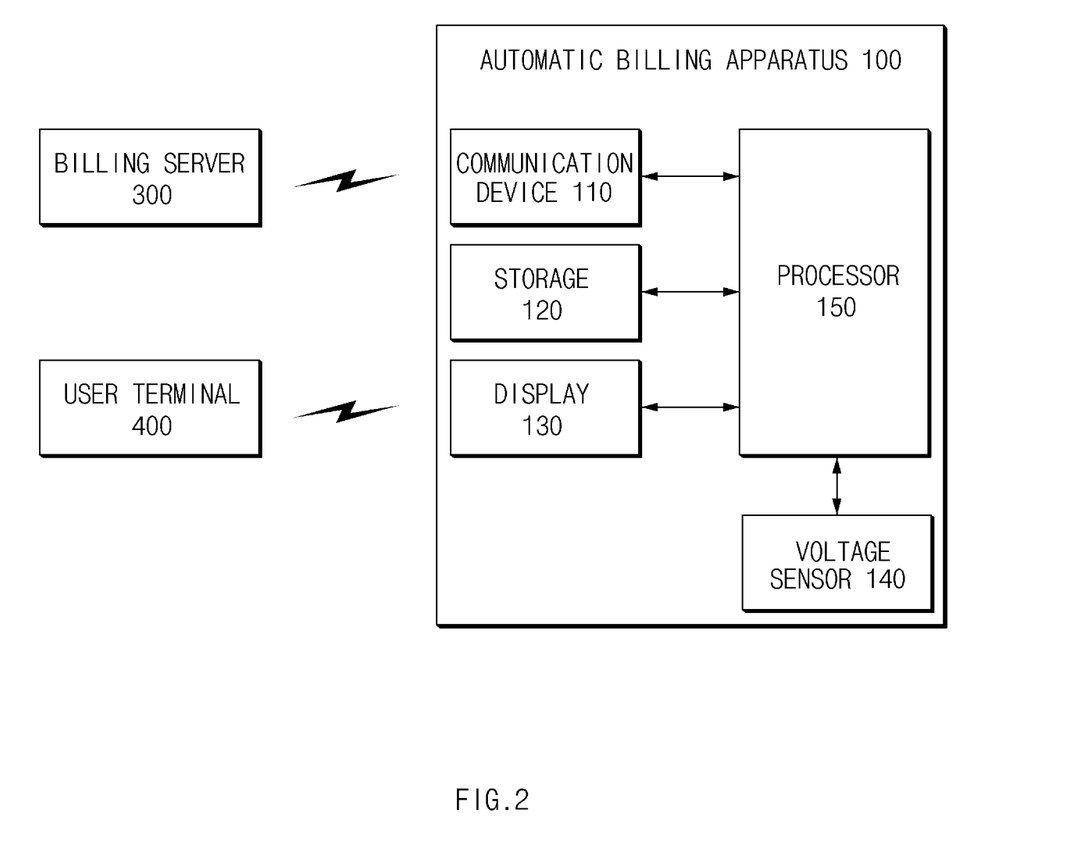
FIG. 2 is a block diagram illustrating a detailed configuration of an automatic billing apparatus according to an embodiment of the present disclosure.

FIG. 1 is a block diagram illustrating a configuration of a system including an automatic billing apparatus according to an embodiment of the present disclosure. FIG. 2 is a block diagram illustrating a detailed configuration of an automatic billing apparatus according to an embodiment of the present disclosure.

Referring to FIGS. 1 and 2, an automatic billing apparatus 100 may be mounted on a charging station system. A vehicle system 200 may be mounted on an electric vehicle requiring charging.

A charging station system 10 is a system for supplying electric energy to a vehicle connected to a charging station connector 11 to perform charging. The charging station system 10 includes the automatic billing apparatus 100, a switch S1, and a resistor R1.

When a vehicle inlet 201 is coupled to the charging station connector 11, the switch S1 may be closed for charging and may be opened when the charging is completed.

The automatic billing apparatus 100 may be included in a charger that supplies electric energy to a vehicle to charge the vehicle. The automatic billing apparatus 100 may perform charge fee collection, parking fee collection for an unattended time, fine collection, and the like. In addition, the automatic billing apparatus 100 may be provided in a public charger.

The automatic billing apparatus 100 may change the control pilot voltage signal from current 12V PWM to 12V DC when the charging starts. The automatic billing apparatus 100 may sense a voltage level of the control pilot signal applied to an output terminal during charging, such that the automatic billing apparatus 100 performs an end time point of charging a vehicle, a parking fee calculation based on an unattended time, a determination of whether the vehicle is an object to be charged a fine, and/or a calculation of a fine for the vehicle to be charged. In addition, the automatic charging apparatus 100 may charge an owner of the vehicle when the vehicle inlet is detached from the connector.

The automatic billing apparatus 100 may include a communication device 110, a storage 120, a display 130, a voltage sensor 140, and a processor 150.

The communication device 110 is a hardware device implemented with various electronic circuits to transmit and receive a signal through a wireless or wired connection. The communication device 110 may perform communication in the vehicle through CAN communication or the like. As shown in FIG. 2, the communication device 110 may communicate with an external billing server 300 and a user terminal 400 through wired/wireless communication. In this case, the billing server 300 may share billing information in cooperation with the automatic billing apparatus 100. The user terminal 400 may include a smart phone, a tablet, a personal computer (PC), a mobile phone, a videophone, an e-book reader, a netbook computer, a personal digital assistant (PDA), a portable multimedia player (PMP), a mobile communication terminal, an electronic notebook, and the like.

The storage 120 may store the unattended time after charging, the weight calculated by the processor 150, the fee based on the calculated unattended time, and the calculated fine. The storage 120 may include a storage medium having at least one type of a flash memory type, a hard disk type, a micro type, a card type of a memory (e.g., a secure digital (SD) card, an extreme digital (XD) card, or the like), RAM (Random Access Memory), SRAM (Static Random Access Memory), ROM (Read-Only Memory), EEPROM (Electrically Erasable Programmable Read-Only Memory), PROM (Programmable Read-Only Memory), MRAM (Magnetic RAM), a magnetic disc, and/or an optical disc.

The display 130 may display a charging amount, a charging time, a charging fee, a parking fee, a fine, and the like. In addition, the display 130 may include at least one of a liquid crystal display (LCD), a thin film transistor liquid crystal display (TFT LCD), a light emitting diode (LED), an organic LED (OLED), an active matrix OLED (AMOLED), a flexible display, a bended display, and/or a 3D display. Some of these displays may be implemented with a transparent display that is transparent or optically transparent to allow an outside to be viewed. In addition, the display 130 may be provided as a touch screen including a touch panel. The display 130 may be used as an input device in addition to an output device.

The voltage sensor 140 may sense a voltage level of an output terminal of the automatic billing apparatus 100, such as a control pilot signal CP applied to the charging station connector 11.

The processor 150 may be electrically connected to the communication device 110, the storage 120, the display 130, and the voltage sensor 140. The processor 150 may electrically control each component and may be implemented with an electronic circuit executing a command of software. The processor 150 may perform various data processing and calculations, which will be described below. For example, the processor 150 may be an electronic control unit (ECU) or a lower level controller mounted on a vehicle.

The processor 150 may provide a vehicle charging service at a charging station, determine that a vehicle is unattended after charging is completed, and perform a billing based on the unattended time.

The processor 150 may determine whether the vehicle inlet 201 and the charging station connector 11 are coupled based on a change in the voltage level of the voltage signal CP sensed by the voltage sensor 140.

When the voltage level of the voltage signal CP sensed by the voltage sensor 140 is a first level (e.g., 12 V), the processor 150 may determine that the vehicle inlet 201 and the charging station connector 11 are not coupled. When the voltage level of the voltage signal CP is a second level (e.g., 9V) that is lower than the first level, the processor 150 may determine that the vehicle inlet 201 and the charging station connector 11 are coupled. When the voltage level of the voltage signal CP is a third level (e.g., 6V) that is lower than the second level, the processor 150 may determine that the vehicle inlet 201 and the charging station connector 11 are still charging. When the voltage level of the voltage signal rises to the second level (e.g., 9V) again, the processor 150 may determine that the charging is completed but the vehicle inlet 201 and the charging station connector 11 are still coupled. When the voltage level of the voltage signal is raised to the third level (e.g., 12V), the processor 150 may determine that the charging is completed and the vehicle inlet 201 is detached from the charging station connector 11.

When the vehicle inlet 201 and the charging station connector 11 are continuously coupled after the charging of the vehicle is completed, the processor 150 may count a time for which the coupling of the vehicle inlet 201 and the charging station connector 11 is maintained after the charging of the vehicle is completed. The counted time may be calculated as the unattended time.

The processor 150 may bill the parking fee based on the unattended time and may determine whether the vehicle, which has completed charging, is an object to be charged a fine based on the unattended time. In other words, the processor 150 may determine that the vehicle, which has completed charging, is an object to be charged the fine when the unattended time exceeds a time specified in advance.

The processor 150 may calculate the weight based on whether the unattended time is in an electric overload time zone and/or the number of waiting vehicles to charge, calculate a billed amount based on the unattended time and the weight, and add the billed amount to the charging fee to charge the charged amount.

As discussed above, when the vehicle that has completed the charging is an object to be charged the fine, the processor 150 may calculate the weight based on whether the unattended time is in the electronic overload time zone and/or the number of waiting vehicles to charge. Equation 1 is an equation for calculating weight 'A' in the case of an overload time zone. Equation 2 is an equation for calculating weight 'B' based on the number of waiting vehicles to charge. In the following equations, 'α' and 'β' are weighting constants.

Weight $A=(1+\alpha)\times$(unattended time accumulated in daytime)               [Equation 1]

Weight $B=(1+\beta)\times$(number of waiting vehicles to charge/number of chargers)            [Equation 2]

The processor 150 may calculate the fine based on the unattended time and the weight and add the parking fee and the fine to the charging fee. Equation 3 is an equation for calculating the fine.

Fine=(Unattended time−total charging time×0.2)×Fine per minute×Weight ($A\times B$)       [Equation 3]

The processor 150 may transmit a charge completion notification (e.g., text) to the user terminal 400 when the charging is completed. Information regarding the user terminal 400 may be input in advance.

The vehicle system 200 includes a vehicle charging controller 210, a diode D, resistors R2 and R3, buffers BUF1 and BUF2, and a switch S2.

The vehicle charging controller 210, which is an on-board battery charge controller (OBC) circuit, performs charging control on a battery (not shown) of a vehicle.

The switch S2 is controlled by the vehicle charging controller 210. The switch S2 is closed when charging is performed and is opened after charging is completed.

Figure 3:
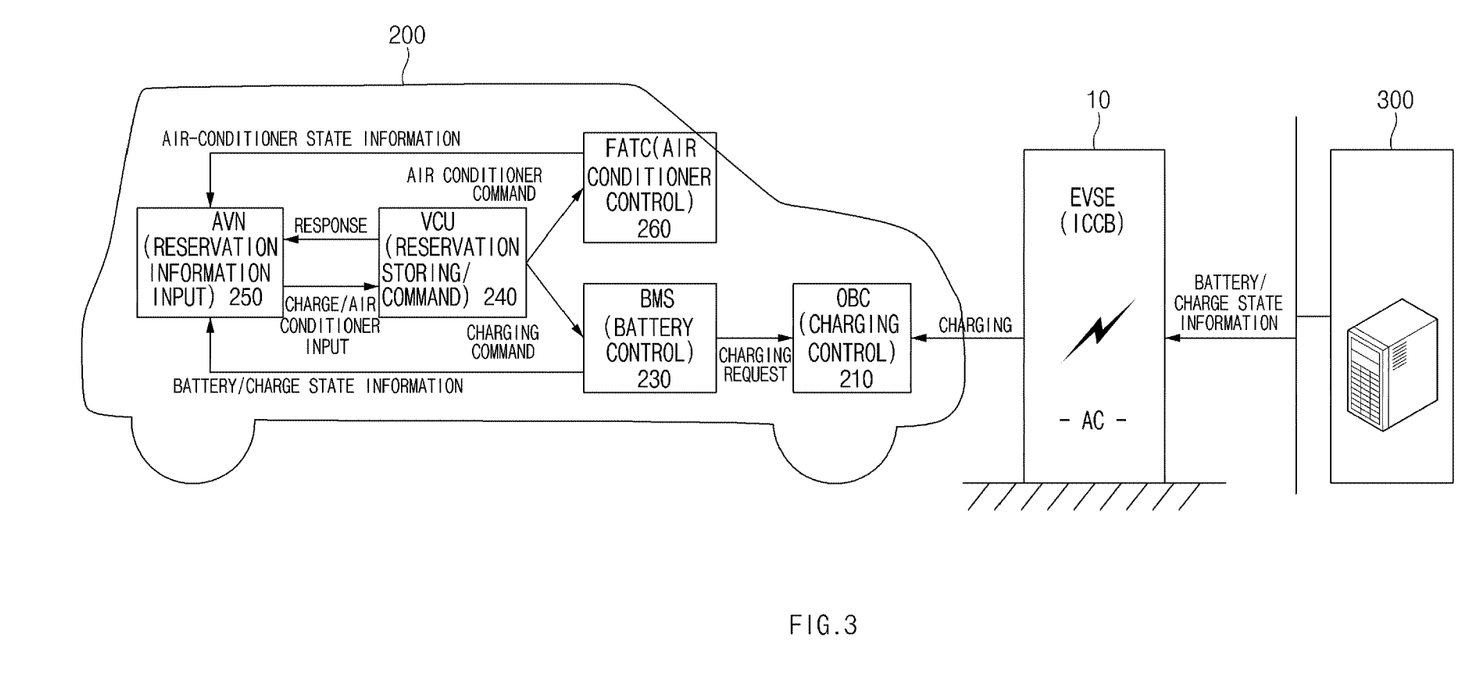
FIG. 3 is a view illustrating operations of a vehicle system and an automatic billing apparatus according to electric charging and fine billing according to an embodiment of the present disclosure.

FIG. 3 is a view illustrating operations of a vehicle system and an automatic billing apparatus according to electric charging and fine billing according to an embodiment of the present disclosure.

Referring to FIG. 3, the vehicle system 200 is connected to a connector of the electric vehicle supply equipment (EVSE) 10 to perform vehicle charging. In this example, the vehicle system 200 includes a charging controller (OBC) 210 for charging control, a battery management system (BMS) 230 for battery control, a fully automatic temperature control (FATC) 260 for air conditioner control, a vehicle control unit (VCU) 240 for reserving and instructing charge, and an audio video navigation (AVN) 250 for inputting reservation information.

The AVN 250 receives charging reservation information from a user, receives and displays information about a battery charging state from the BMS 230, and receives and displays information about an air conditioning state from the FATC 260. When receiving the charging reservation information and a charging/air-conditioning command from the AVN 250, the VCU 240 stores the reservation information, transmits the air-conditioning command to the FATC 260, and transmits the charging command to the BMS 230. The BMS 230 transmits the charging command to the charging controller 210 and the charging controller 210 performs charging of the vehicle through the connector of the charging station system (EVSE) 10. The billing server 300 may transmit information about the parking charge and the fine to the charging station system 10.

As described above, according to the present disclosure, determining whether a vehicle is left unattended after charging and automatically collecting a fee for the unattended vehicle is possible by sensing the voltage level of the control pilot signal generated from the charging system (charger) to determine whether the connector is coupled. The vehicle that has completed charging is thereby induced to move out of the charging station.

In addition, according to the present disclosure, the unattended time of the vehicle after charging is completed may be calculated to collect the parking fee or the fine. The weight of the fine may be given in consideration of the number of waiting vehicles and/or the charging time zone of the charging station. Accordingly, performing reasonable billing is possible.

TABLE 1

| CP state | Normal state voltage | Min. | Max. | Connector connecting state | Vehicle | EVSE |
|---|---|---|---|---|---|---|
| A | 12 V DC | 12.60 | 12.60 | Not coupled | — | — |
| B1 | 9 V DC | 8.36 | 9.56 | Coupled | Not ready to receive energy | Impossible to supply energy |
| B2 | +9 V/ −12 V PWM | ↑ | ↑ | Coupled | Not ready to receive energy | Possible to supply energy |
| C | +6 V/ −12 V PWM | 5.48 | 6.49 | Coupled | Ready to receive energy | Possible to supply energy, Not require ventilation of indoor charging space |
| D | +3 V/ −12 V PWM | 2.62 | 3.25 | Coupled | ↑ | Possible to supply energy, Require ventilation of indoor charging space |
| E | 0 V | | | Not coupled | — | Not apply AC power or CP-GND short |
| F | −12 V DC | | | | Other problem | (Other EVSE problem) |

Figure 4:
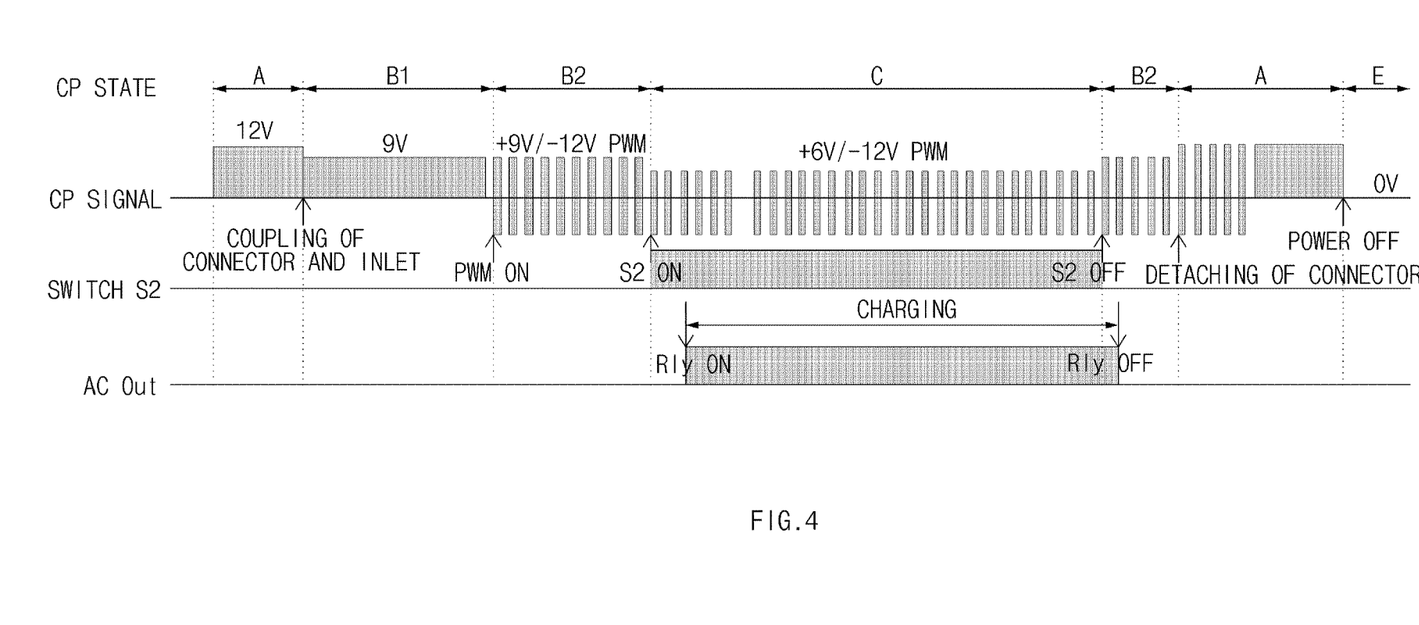
FIG. 4 is a timing chart for explaining an operation of determining an unattended vehicle after charging according to an embodiment of the present disclosure.

Hereinafter, an operation of determining an unattended vehicle will be described with reference to table 1 and FIG. 4. Table 1 illustrates a control pilot (CP) state according to a connector coupling state. FIG. 4 is a timing chart for explaining an operation of determining an unattended vehicle after charging according to an embodiment of the present disclosure.

Referring to FIGS. 1 and 4, when the switch S1 is connected to the PWM terminal and a PWM signal is applied, the charging controller 210 turns off (closes) the switch S2 to start charging.

The control pilot signal CP maintains 12 V DC in section W before the charging station connector and the vehicle inlet are coupled to each other and maintains 9 V DC (or 9 V PWM) in section 'B1' where the vehicle inlet is connected to the charging station connector. In the automatic billing apparatus 100, when 12 V DC is applied, 12 V DC is dropped to 9 V DC by the resistor R3 of the vehicle system 200.

When the +9V/−12V PWM signal is applied in the period B2 in which the PWM signal is applied and the switch S2 of the vehicle system 200 is closed to be turned on, the +9V/−12V PWM signal is lowered to the +6V/−12V PWM signal.

When the charging is completed and the switch S2 is turned off (opened) in section 'B2', the voltage level of the CP signal rises from +6V/−12V level to +9V/−12V level.

When the vehicle inlet is detached from the connector (in section 'A'), the voltage level of the CP signal is at +12V/−12V level.

As described above, when the vehicle inlet is not detached from the charging station connector after the charging is completed, the voltage level of the control pilot signal is maintained at 9 V by the resistor R3. When the vehicle inlet is detached from the charging station connector, the voltage level of the control pilot signal raises to 12V. Accordingly, the automatic billing apparatus 100 may determine whether the vehicle inlet is detached from the charging station connector by using the change in the voltage level of the control pilot signal.

As described above, the automatic billing apparatus 100 may periodically measure the voltage level of the control pilot signal to determine whether the vehicle inlet is detached from the charging station connector and may determine the unattended time of the vehicle according to whether the vehicle inlet is detached from the connector. In this case, even though the switch S2 of the vehicle system 200 is turned off and the vehicle charging controller 210 is turned off, power is continuously supplied from the charging station system 10. Accordingly, the automatic billing apparatus 100 may sense the voltage level of the control pilot signal.

Figure 5:
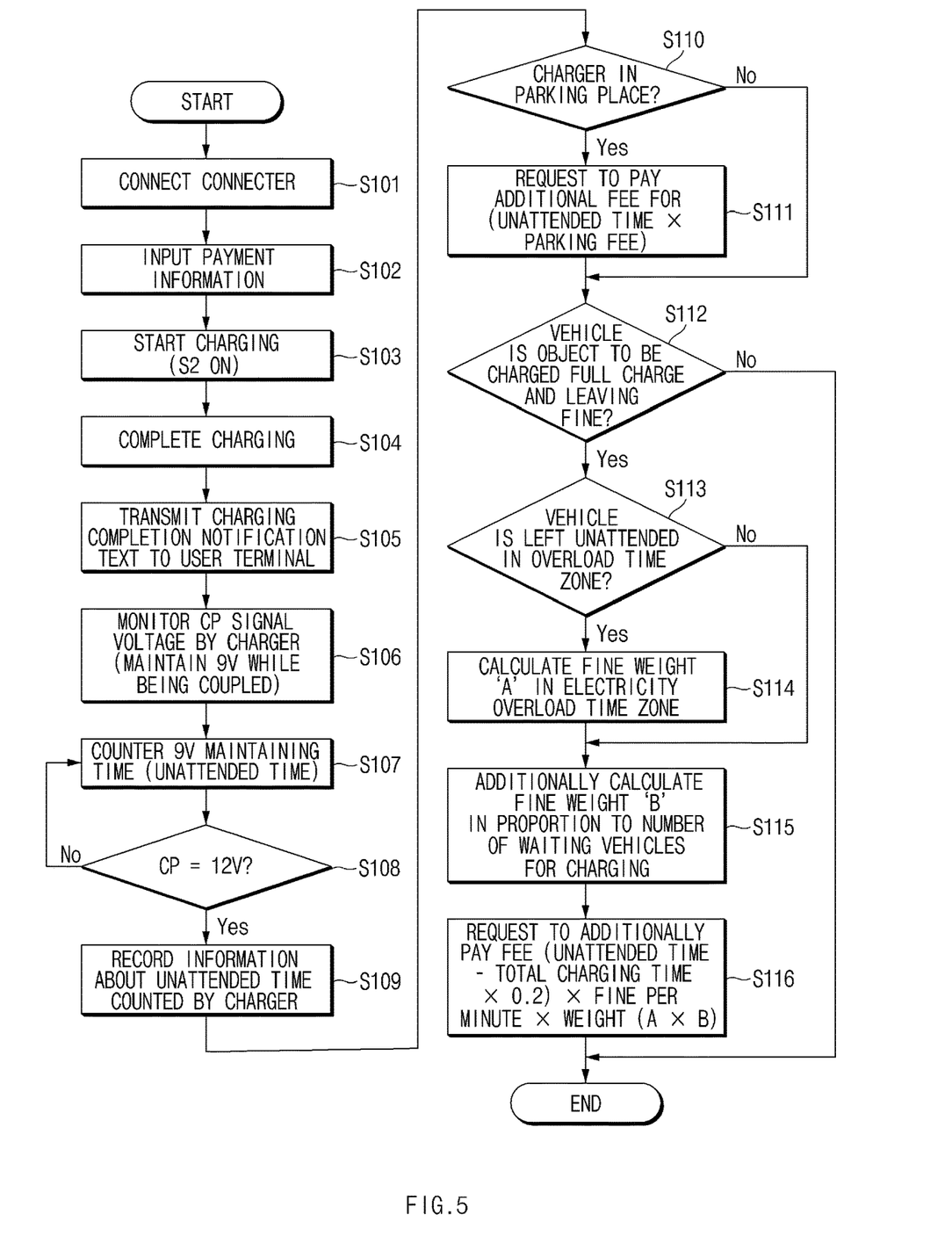
FIG. 5 is a flowchart illustrating a method of automatically billing a vehicle unattended at a charging station according to an embodiment of the present disclosure.

Hereinafter, a method of automatically billing a vehicle unattended at a charging station according to an embodiment of the present disclosure will be described in detail with reference to FIG. 5. FIG. 5 is a flowchart illustrating a method of automatically billing a vehicle unattended at a charging station according to an embodiment of the present disclosure.

Hereinafter, it is assumed that the apparatus 100 of FIG. 1 performs the process of FIG. 5. In addition, in the description of FIG. 5, it may be understood that the operations described as being performed by the apparatus are controlled by the processor 150 of the apparatus 100, as shown in FIG. 2.

Referring to FIG. 5, when the vehicle inlet is coupled to the charging station connector in order to charge the vehicle in operation S101, the automatic billing apparatus 100 receives payment information from the user in operation S102. In this case, the payment information may include user terminal information (e.g., a telephone number, and the like), payment card information, and the like.

When the switch S2 of the vehicle system 200 is turned on to start charging in operation S103 and the charging is completed in operation S104, the automatic billing apparatus 100 transmits a charge completion notification text to a user terminal in operation S105.

In operation S106, the automatic billing apparatus 100 monitors the voltage level of the control signal. When the voltage level of the control signal is 9V, the automatic charging apparatus 100 determines that the vehicle inlet is still coupled to the connector even after the charging is completed. In this case, the state in which the vehicle inlet is continued to be connected to the charging station connector even after charging completion is regarded as the unattended time.

In operation S107, the automatic billing apparatus 100 counts the time (unattended time) for the state (9 V), which the vehicle inlet is continuously connected to the charging station connecter, is maintained and continuously monitors the voltage level of the control signal. When the voltage level of the control signal rises to 12 V, the automatic charging apparatus 100 determines that the vehicle inlet is detached from the charging station connector.

In operation S109, the automatic billing apparatus 100 records the unattended time (9V maintaining time) after the charging is completed in the state (9V), which the vehicle inlet is continuously coupled to the charging station connector. In operation S110, the automatic billing apparatus 100 determines whether the charger of the present charging station system is a charger in a parking lot.

In operation S111, in the case of the charger being in the parking lot, the automatic billing apparatus 100 calculates the parking fee for the unattended time, adds the parking fee to the charging fee, and requests a payment. In this case, the payment request may be displayed on the display 130 of the automatic billing apparatus 100 to indicate that the fee is collected based on the payment card information of the user inputted in the operation S102. When collecting the fee, the automatic billing apparatus 100 may perform the fee collection in a general payment scheme using a payment card (e.g., password input, or the like).

In operation S112, the automatic billing apparatus 100 determines whether the vehicle that has completed charging is an object to be charged a fine. When a time specified in advance is elapsed after the charging of the vehicle is completed, the automatic billing apparatus 100 may determine the vehicle is the object to be charged a fine. Unlike the parking fee, the fine is a concept of penalty. Accordingly, the fine cannot be charged immediately after the charging is completed because a certain 'tolerance time point' at which charging is completed and the fine is actually charged is required. Generally, the longer the actual charge time is, the harder it is to estimate the charging completion time. Accordingly, the tolerance time point must be longer. In the present disclosure, about 20% of the total charging time is regarded as the "tolerance time point." A fine is charged thereafter. For example, when a standard charge takes 10 hours, the fine is charged two hours later after the charging is completed. In case of fast charging that takes 50 minutes, the fine is charged 10 minutes after the charging is completed.

In operation S113, when a corresponding vehicle is an object to be charged a fine, the automatic billing apparatus 100 determines whether the unattended time is in an overload time zone. For example, electricity charges are set higher in the daytime for which demand is higher than that in the nighttime hours. Therefore, the fine may be charged by additionally applying a fine weight for a vehicle that is unattended in the daytime for which electricity charges (i.e., charging demand) are high. The automatic billing apparatus 100 may check the electricity charge for each hour by connecting to the KEPCO system after confirming the unattended time when the vehicle is left unattended and may charge a fine accordingly. For example, since the electricity rate, which is currently proposed by KEPCO, is relatively low during 23 to 9 o'clock, the fine may be low. During 9 to 23 o'clock, the fine may be charged at a higher amount. The automatic billing apparatus 100 may collect the fine based on the payment card information of a user among the payment information inputted in the operation S102.

When the unattended time is in the overload time zone, the automatic billing apparatus 100 may calculate the fine weight 'A' of the electricity overload time zone in operation S114 and may calculate the fine weight 'B' in proportion to the number of charged vehicles in operation S115. Accordingly, proceeding with the addition of the fine in proportion to the number of waiting vehicles (demand quantity) is possible. The number of waiting vehicles may be calculated in terms of a vehicle or parking infrastructure. When the confirmation is performed at a vehicle party, the vehicle system 200 communicates with the surrounding vehicles through a V2I system to count vehicles with navigation destinations set within 10 m from the charging station, vehicles that inform the automatic billing apparatus 100 of charging intention, and the like. The vehicle system 200 may charge an additional fine relative to the number of waiting vehicles for charging after recognizing the number of waiting vehicles for charging. Meanwhile, the automatic billing apparatus 100 may calculate the number of waiting vehicles for charging through video equipment (e.g., a camera) by for example, counting the number of vehicles having blue license plates (electric vehicles) to calculate the number of waiting vehicle for charging. In this case, the number of waiting vehicles for charging may be calculated by subtracting the actual number of charged vehicles from the counted number of vehicles. The automatic charging apparatus 100 may additionally charge a fine corresponding to a value obtained by dividing the number of waiting vehicles for charging by the number of charging stations.

In operation S116, after calculating the total fine by multiplying the value obtained by subtracting 20% of the total charging time from the unattended time by a fine per minute and the weight A or B, the automatic billing apparatus 100 requests the user to pay an additional fee.

According to the present disclosure, determining whether an electric vehicle has been left unattended after being charged and automatically billing the parking fee in consideration of the unattended time is possible. When the electric vehicle is left unattended after being charged, determining whether the electric vehicle is an object to be charged a fine and calculate a weight based on an electric overload time zone and/or the number of charged vehicles to calculate and bill a fine is possible. The charge completion vehicle may be induced to be moved, thereby enabling the charging station to be efficiently operated.

Figure 6:
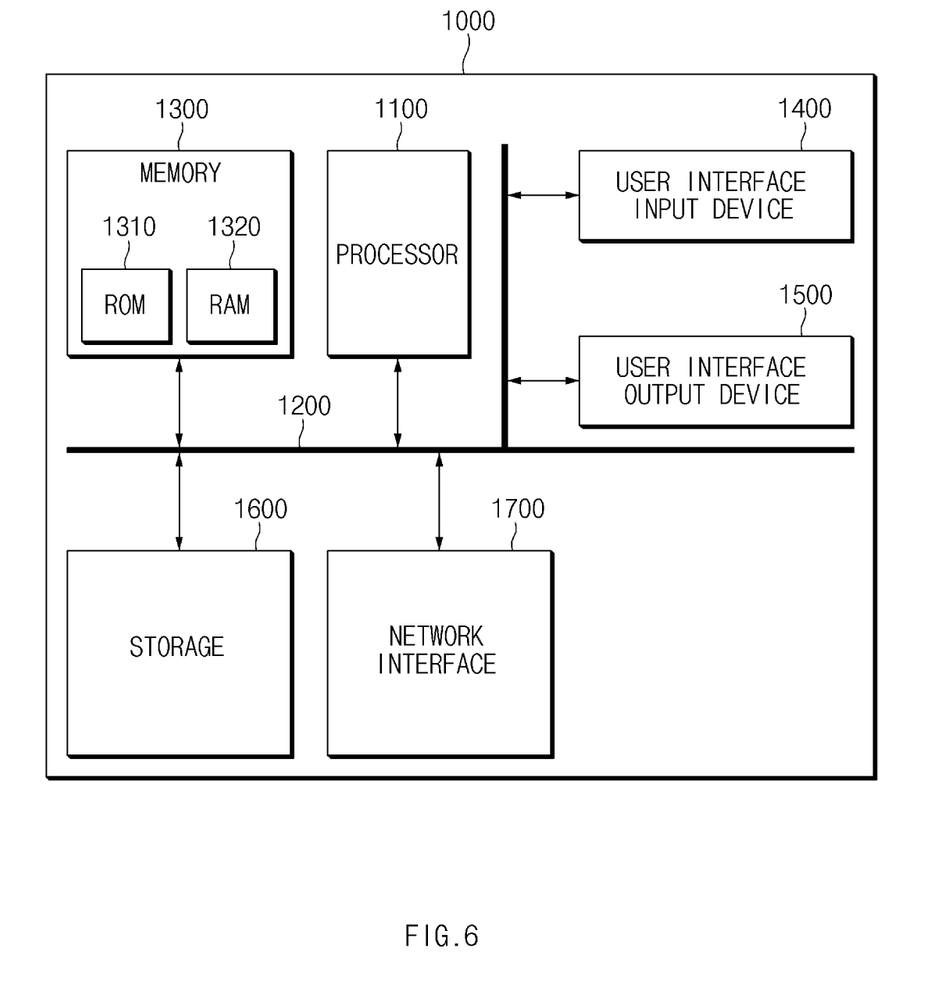
FIG. 6 illustrates a computing system according to an embodiment of the present disclosure.

FIG. 6 illustrates a computing system according to an embodiment of the present disclosure.

Referring to FIG. 6, a computing system 1000 may include at least one processor 1100, a memory 1300, a user interface input device 1400, a user interface output device 1500, storage 1600, and an interface 1700, which are connected to each other through a bus 1200.

The processor 1100 may be a central processing unit (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the embodiments disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, a hard disk, a removable disk, a compact disc-ROM (CD-ROM), and the like.

A storage medium is coupled to the processor 1100 such that the processor 1100 may read information from and write information to the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

According to the present technology, when a vehicle is left unattended after being charged, the fine may be automatically collected by determining the unattended time of the vehicle and whether the vehicle is an object to be charged a fine. The charge completion vehicle is thereby induced to move out of the charging station.

In addition, various effects that are directly or indirectly understood through the present disclosure may be provided.

Although the present disclosure has been described hereinabove with reference to embodiments and the accompanying drawings, the present disclosure is not limited thereto and may be variously modified and altered by those skilled in the art to which the present disclosure pertains without departing from the spirit and scope of the present disclosure claimed in the following claims.

What is claimed is:

1. An automatic billing apparatus comprising:
   a processor configured to provide a vehicle charging service at a charging station, determine a vehicle is unattended after charging is completed, and perform a billing based on an unattended time; and
   a storage configured to store data obtained by the processor when the billing is performed,
   wherein the processor is further configured to:
      calculate a first weight based on whether the unattended time is in an electric overload time zone;
      calculate a second weight based on a number of waiting vehicles to charge;
      calculate a billed amount based on the unattended time, the first weight and the second weight; and
      bill the billed amount by adding the billed amount to a charging fee.

2. The automatic billing apparatus of claim 1, further comprising:
   a voltage sensor configured to sense a voltage level of a voltage signal applied to a charging station connector.

3. The automatic billing apparatus of claim 2, wherein the processor is further configured to determine whether a vehicle inlet and the charging station connector are coupled based on a change in the voltage level of the voltage signal sensed by the voltage sensor.

4. The automatic billing apparatus of claim 3, wherein the processor is further configured to:
   determine that the vehicle inlet and the charging station connector are not coupled when the voltage level of the voltage signal sensed by the voltage sensor is a first level;
   determine that the vehicle inlet and the charging station connector are coupled when the voltage level of the voltage signal is a second level, wherein the second level is lower than the first level;
   determine that the vehicle inlet and the charging station connector are in a charging state when the voltage level of the voltage signal is a third level, wherein the third level is lower than the second level;
   determine that the charging is completed and the vehicle inlet is coupled to the charging station connector when the voltage level of the voltage signal is increased to the second level from the third level; and
   determine that the charging is completed and the vehicle inlet is detached from the charging station connector when the voltage level of the voltage signal is increased to the first level from the third level.

5. The automatic billing apparatus of claim 3, wherein the processor is further configured to calculate the unattended time by counting a connection maintaining time of the vehicle inlet and the charging station connector from a time when the vehicle inlet and the charging station connector are continuously coupled after the charging of the vehicle is completed.

6. The automatic billing apparatus of claim 1, wherein the processor is further configured to bill a parking fee based on the unattended time.

7. The automatic billing apparatus of claim 1, wherein when the vehicle has completed charging, the processor is further configured to determine whether the vehicle is an object to be charged a fine based on the unattended time.

8. The automatic billing apparatus of claim 7, wherein the processor is further configured to determine that the vehicle is the object to be charged the fine when the unattended time exceeds a specified time.

9. The automatic billing apparatus of claim 1, wherein the processor is further configured to transmit a charge end notification to a user terminal when the charging is completed.

10. A charging system comprising:
a vehicle charging control device configured to control charging of a vehicle; and
an automatic charging apparatus configured to interwork with the vehicle charging control device to provide a vehicle charging service at a charging station, determine that the vehicle is unattended after charging is completed, and perform a billing based on an unattended time,
wherein the automatic charging apparatus is further configured to:
calculate a first weight based on whether the unattended time is in an electric overload time zone;
calculate a second weight based on a number of waiting vehicles to charge;
calculate a billed amount based on the unattended time, the first weight and the second weight; and
bill the billed amount by adding the billed amount to a charging fee.

11. An automatic billing method comprising:
providing charging to a vehicle that requests a vehicle charging service;
determining the vehicle is unattended after the charging is completed;
calculating an unattended time of the vehicle determined to be unattended; and
performing a billing based on the unattended time, wherein performing the billing comprises:
calculating a first weight based on whether the unattended time is in an electric overload time zone;
calculating a second weight based on a number of waiting vehicles to charge;
calculating a billed amount based on the unattended time, the first weight and the second weight; and
billing the billed amount by adding the billed amount to a charging fee.

12. The automatic billing method of claim 11, wherein the determining that the vehicle is unattended includes:

sensing a voltage level of a voltage signal applied to a charging station connector;
determining whether a vehicle inlet and the charging station connector are coupled based on a change in the voltage level of the sensed voltage signal; and
determining the vehicle is unattended when the vehicle inlet and the charging station connector are continuously coupled after the charging of the vehicle is completed.

13. The automatic billing method of claim 12, wherein the determining of the connection between the vehicle inlet and the charging station connector includes:
determining that the vehicle inlet and the charging station connector are not coupled when the voltage level of the voltage signal is a first level;
determining that the vehicle inlet and the charging station connector are coupled when the voltage level of the voltage signal is a second level, wherein the second level is lower than the first level;
determining that the charging station connector is in a charging state when the voltage level of the voltage signal is a third level, wherein the third level is lower than the second level;
determining that the charging is completed and the vehicle inlet is coupled to the charging station connector when the voltage level of the voltage signal is increased to the second level from the third level; and
determining that the charging is completed and the vehicle inlet is detached from the charging station connector when the voltage level of the voltage signal is increased to the first level from the third level.

14. The automatic billing method of claim 11, wherein the calculating of the unattended time of the vehicle includes:
calculating a connection maintaining time of the vehicle inlet and the charging station connector from a time when the charging of the vehicle is completed and the vehicle inlet is continuously coupled to the charging station.

15. The automatic billing method of claim 11, wherein the performing of the billing includes:
billing a parking fee based on the unattended time.

16. The automatic billing method of claim 11, wherein the performing of the billing includes:
determining that the vehicle that has completed the charging is an object to be charged a fine when the unattended time exceeds a specified time.

17. The automatic billing method of claim 11, wherein the performing of the billing includes:
calculating a weight based on whether the unattended time is in an electric overload time zone, a number of waiting vehicles to charge, or a combination thereof; and
calculating a fine based on the unattended time and the weight.

18. The automatic billing method of claim 17, wherein the performing of the billing includes:
billing the fine by adding the fine to a charging fee.

* * * * *